US010843298B2

(12) United States Patent
Kawasaki et al.

(10) Patent No.: US 10,843,298 B2
(45) Date of Patent: Nov. 24, 2020

(54) FLUX AND SOLDER PASTE

(71) Applicant: SENJU METAL INDUSTRY CO., LTD., Tokyo (JP)

(72) Inventors: Hiroyoshi Kawasaki, Tokyo (JP);
Masato Shiratori, Tokyo (JP);
Takahiro Nishizaki, Tokyo (JP);
Tomohisa Kawanago, Tokyo (JP)

(73) Assignee: SENJU METAL INDUSTRY CO., LTD., Tokyo (JP)

(*) Notice: Subject to any disclaimer, the term of this patent is extended or adjusted under 35 U.S.C. 154(b) by 160 days.

(21) Appl. No.: 16/329,716

(22) PCT Filed: Aug. 24, 2018

(86) PCT No.: PCT/JP2018/031263
§ 371 (c)(1),
(2) Date: Feb. 28, 2019

(87) PCT Pub. No.: WO2019/102671
PCT Pub. Date: May 31, 2019

(65) Prior Publication Data
US 2019/0366487 A1 Dec. 5, 2019

(30) Foreign Application Priority Data

Nov. 24, 2017 (JP) ................................ 2017-225681

(51) Int. Cl.
*B23K 35/362* (2006.01)
*B23K 35/36* (2006.01)
*B23K 35/02* (2006.01)

(52) U.S. Cl.
CPC .......... *B23K 35/362* (2013.01); *B23K 35/025* (2013.01); *B23K 35/3613* (2013.01); *B23K 35/3615* (2013.01); *B23K 35/3616* (2013.01)

(58) Field of Classification Search
None
See application file for complete search history.

(56) References Cited

U.S. PATENT DOCUMENTS

| | | | | |
|---|---|---|---|---|
| 10,556,299 B2* | 2/2020 | Yamasaki | ............ | C08K 5/5317 |
| 10,688,603 B2* | 6/2020 | Onitsuka | ............ | B23K 35/0266 |
| 2006/0027629 A1* | 2/2006 | Inbe | ............ | C09D 129/04 |
| | | | | 228/101 |
| 2015/0158128 A1 | 6/2015 | Hagiwara et al. | | |
| 2017/0240712 A1* | 8/2017 | Sugawara | ............ | C08L 9/02 |
| 2017/0304961 A1 | 10/2017 | Takagi et al. | | |

FOREIGN PATENT DOCUMENTS

| | | |
|---|---|---|
| JP | 2002-103085 A | 4/2002 |
| JP | 2008-239713 A | 10/2008 |
| JP | 2016-93816 A | 5/2016 |
| WO | WO-2008/035758 A1 | 3/2008 |
| WO | WO-2013/187363 A1 | 12/2013 |

OTHER PUBLICATIONS

International Search Report dated Oct. 2, 2018 in corresponding International Application No. PCT/JP2018/031263 (English translation).

International Search Report and Written Opinion of the International Search Authority issued in PCT/JP2018/031263 (in Japanese), dated Oct. 2, 2018; ISA/JP.

Decision to Grant a Patent issued in JP 2017-225681 (granted as JP-6390989-B1) dated Jul. 27, 2018 (drafted Jul. 23, 2018) with English Translation.

* cited by examiner

*Primary Examiner* — Joseph D Anthony
(74) *Attorney, Agent, or Firm* — Harness, Dickey & Pierce, P.L.C.

(57) ABSTRACT

An object of the present invention is to provide a flux which does not precipitate a crystal and can improve solder wettability.

A flux comprising 0.4 to 10.0 mass % of ditolylguanidine and 1.0 to 10.0 mass % of an organic acid, and not comprising diphenylguanidine as an amine compound.

7 Claims, No Drawings

FLUX AND SOLDER PASTE

CROSS-REFERENCE TO RELATED APPLICATIONS

This application is the U.S. National Phase Application under 35 U.S.C. 371 of International Application No. PCT/JP2018/031263, filed on Aug. 24, 2018, which claims the benefit of priority from Japanese Patent Application No. 2017-225681, filed on Nov. 24, 2017. The entire disclosures of these applications are incorporated herein by reference in their entirety.

TECHNICAL FIELD

The present invention relates to a flux and a solder paste.

BACKGROUND ART

Fixation and electrical connection of an electronic component in electronic equipment, such as mounting of the electronic component on a printed board, are generally performed by soldering, which is most advantageous in terms of cost and reliability.

In this soldering, a flux, which is an auxiliary agent for making solder easily adhere to the printed board and the electronic component, is used. The flux plays many useful actions such as: (1) a metal surface cleaning action (action of chemically removing oxide films on the metal surfaces of the printed board and the electronic component to clean the surfaces so that the surfaces can be soldered); (2) an reoxidation-preventing action (action of covering the cleaned metal surface during soldering, blocking contact with oxygen, and preventing metal surface from being reoxidized by heating); and (3) an interfacial tension lowering action (action of reducing the surface tension of the molten solder and enhancing the wettability of the metal surface with the solder).

In particular, as for (3) out of the above description, solder wettability is an important property, in view of improving solderability.

An activator is added to the flux in order to improve the solderability, and as such an activator, an organic acid, an amine compound, an amine hydrohalide salt, an organohalogen compound and the like are used. In order to function as the activator, it is required to be stably present in the flux and to prevent the precipitation of crystals when the activator has been added.

Among the above described activators, conventionally, diphenylguanidine is generally used as the amine compound.

As a conventional example in which the amine compound is added to the flux, PTL 1 proposes a reduction type flux composition which contains at least one biguanide compound, and also discloses that the composition further contains an amine compound which is at least one selected from mercaptobenzothiazole, imidazole, pyrazole, benzotriazole, benzimidazole, dicyandiamide, diphenylguanidine, ditolylguanidine, 3-amino-1H-1,2,4-triazole, 4-amino-4H-1,2,4-triazole, and alkyl group-substituted products thereof.

In addition, PTL 2 proposes a Sn—Zn based lead-free solder paste that is a solder paste in which a Sn—Zn based lead-free solder alloy powder and a flux are kneaded and which contains 10 to 30 mass % of a guanidine derivative as an amine in the flux, and also discloses that the guanidine derivative is 1,3-diphenylguanidine, 1,3-di-o-tolylguanidine or 1-o-tolylbiguanide.

Furthermore, PTL 3 proposes a flux composition which contains 65 to 94 mass % of a resin insoluble in water as a base material, and contains at least 3 to 22 mass % of an amine and 1 to 30 mass % of an amine fluoride salt produced by a reaction between an amine and an acid, and also discloses that the flux composition contains at least one selected from a pyridine derivative, an imidazole derivative, a guanidine derivative, ethylamine and picoperine, as the amine.

However, in Examples of PTL 1, the amine compound which is specifically used is an amine compound other than a guanidine-based compound, and the guanidine-based compound is not specifically investigated.

In addition, in Examples and Comparative Examples of PTL 2, fluxes are specifically disclosed which are a flux containing 8 mass %, 10 mass % or 15 mass % of 1,3-diphenylguanidine and 0.5 mass % of a maleic acid, and a flux containing 4 mass %, 8 mass % or 10 mass % of 1,3-di-o-tolylguanidine and 0.5 mass % of a maleic acid. However, PTL 2 does not consider the solder wettability at the time when having been used as the flux, and as described later in Comparative Examples of the present application, it has been found that in the flux containing the 1,3-diphenylguanidine, when the content of an organic acid has been increased so as to improve the solder wettability, crystals precipitate, each of the components becomes non-uniform, and the flux does not sufficiently function.

Furthermore, in Examples of PTL 3, although the guanidine derivative is used as the amine, no specific type of the guanidine derivative is disclosed, and the problems of solder wettability and precipitation of the crystals described above are not disclosed at all.

As described above, a flux is desired which does not precipitate a crystal and improves the solder wettability.

CITATION LIST

Patent Literature

PTL 1: Japanese Patent Laid-Open No. 2002-103085
PTL 2: International Publication No. WO 2008/035758
PTL 3: International Publication No. WO 2013/187363

SUMMARY OF INVENTION

Technical Problem

An object of the present invention is to provide a flux and a solder paste which do not a precipitate crystal and improve solder wettability.

Solution to Problem

As a result of having made an extensive investigation to solve the above described problems, the present inventors have found that the above described problems can be solved by using a flux which contains both a specific amount of ditolylguanidine and a specific amount of an organic acid, and have accomplished the present invention. Specific aspects of the present invention are as follows.

In the present specification, when a numeric range is expressed with the use of "to", the range includes numeric values at both ends.

[1] A flux comprising 0.4 to 10.0 mass % of ditolylguanidine and 1.0 to 10.0 mass % of an organic acid, and not comprising diphenylguanidine as an amine compound.

[2] The flux according to [1], wherein a mass ratio of the organic acid to an amine compound comprising the ditolylguanidine (organic acid/amine compound) is 0.5 to 12.5.

[3] The flux according to [1] or [2], further comprising: 0 to 10.0 mass % of an amine compound except the ditolylguanidine; 0 to 7.0 mass % of an organohalogen compound; 0 to 3.0 mass % of an amine hydrohalide salt; 0 to 70.0 mass % of a rosin-based resin; 0 to 10.0 mass % of an antioxidant; 0 to 10.0 mass % of a thixotropic agent; and 20.0 to 90.0 mass % of a solvent.

[4] A solder paste comprising the flux according to any one of [1] to [3] and a solder powder.

Advantageous Effects of Invention

The flux of the present invention does not precipitate a crystal and can improve solder wettability.

The present inventors have found that when diphenylguanidine which has been generally used so far is used as an amine compound, a crystal precipitates in an atmosphere under an acidic condition in which much organic acid exists. On the other hand, the present inventors have found that a crystal does not precipitate even in an atmosphere under an acidic condition by using not diphenylguanidine but ditolylguanidine. Details of the reason are not clear, but the reason is presumed as follows.

The conventional diphenylguanidine has tautomers, and an imino form and an amino form exist. The equilibrium in these tautomers is biased toward the amino form, and in the solid state, a crystal of the amino form is observed. The diphenylguanidine becomes a salt form when being neutralized with an acid, and the crystal structure in the solid state also changes further. (Aya Tanatani, et al., N-Methylated Diphenylguanidines: Conformations, Propeller-Type Molecular Chirality, and Construction of Water-Soluble Oligomers with Multilayered Aromatic Structures, Journal of American Chemical Society, 1998, 120 (26), 6433-6442). It is considered that the salt form of the diphenylguanidine which exists in the atmosphere under this acidic condition resists dissolving in a solution because of being dense in the crystal structure and precipitates as a crystal.

On the other hand, it is considered that the ditolylguanidine is greatly different from the diphenylguanidine in crystal structure due to steric hindrance of the methyl group which bonds to the aromatic ring (C. J. Brown, et al., N,N'-Bis(2-methylphenyl)guanidine, $C_{15}H_{17}N_3$, Acta Cryst, 1984, C40, 562-564), and that the solubility in a solution field changes because of the difference in crystal structure. In the case of the ditolylguanidine, even the amino form is sterically bulky and its crystal structure becomes sparse as compared with that of the diphenylguanidine, and accordingly there is a possibility that the crystal structure becomes sparse even when the salt form has been formed. It is considered that because of this, the ditolylguanidine, when having been employed, more easily dissolves in the solution than the diphenylguanidine, and the crystal of the salt form does not precipitate even in an atmosphere under an acidic condition.

DESCRIPTION OF EMBODIMENTS

The flux and the solder paste of the present invention will be described below.

The flux of the present invention contains ditolylguanidine and an organic acid, and does not contain diphenylguanidine as an amine compound.

As the ditolylguanidine, 1,3-di-o-tolylguanidine, 1,3-di-p-tolylguanidine, 1,3-di-m-tolylguanidine and the like can be used, and the 1,3-di-o-tolylguanidine is preferable. The content of the ditolylguanidine based on the total mass of the flux is 0.4 to 10.0 mass %, and is preferably 0.4 to 6.0 mass %. As long as the content of the ditolylguanidine is within the above described range, it is possible to improve solder wettability while suppressing the precipitation of the crystal, by use in combination with an organic acid described later.

As the organic acid, glutaric acid, succinic acid, maleic acid, adipic acid, DL-malic acid, diglycolic acid, azelaic acid, eicosanedioic acid, citric acid, glycolic acid, salicylic acid, dipicolinic acid, dibutylaniline diglycolic acid, suberic acid, sebacic acid, thioglycolic acid, terephthalic acid, dodecanedioic acid, para-hydroxyphenylacetic acid, picolinic acid, phenylsuccinic acid, phthalic acid, fumaric acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethylglutaric acid, 2-quinolinecarboxylic acid, 3-hydroxybenzoic acid, p-anisic acid, stearic acid, 12-hydroxystearic acid, oleic acid, linoleic acid, linolenic acid, dimer acid, hydrogenated dimer acid, trimer acid, hydrogenated trimer acid and the like can be used, and it is preferable to use the glutaric acid, the succinic acid, the maleic acid, the adipic acid, the DL-malic acid and the diglycolic acid, from the viewpoint of increasing a wetting rate. The content of the organic acid based on the total mass of the flux is 1.0 to 10.0 mass %, is preferably 3.0 to 10.0 mass %, and more preferably 3.0 to 8.0 mass %. As long as the content of the organic acid is within the above described range, it is possible to improve solder wettability while suppressing the precipitation of the crystal, by use in combination with the above described ditolylguanidine.

As described above, when diphenylguanidine is used as an amine compound, there is a case where the crystal precipitates in an atmosphere under an acidic condition in which much organic acid exists. Because of this, the flux of the present invention does not contain diphenylguanidine as an amine compound. Here, "not containing (comprising) diphenylguanidine as an amine compound" means not containing diphenylguanidine as an intentional additive, and even when the diphenylguanidine is contained as an impurity, the content is preferably 0.1 mass % or less, and more preferably 0.01 mass % or less. Examples of the diphenylguanidines which are not contained in the flux of the present invention include 1,3-diphenylguanidine.

A mass ratio of an organic acid to an amine compound containing ditolylguanidine (organic acid/amine compound) is preferably 0.5 to 12.5, more preferably 1.0 to 12.5, and most preferably 1.0 to 5.0. As long as the mass ratio of the organic acid to the amine compound is within the above described range, it is possible to improve solder wettability and workability.

The content of an amine compound containing ditolylguanidine based on the total mass of the flux is preferably 0.4 to 10.0 mass %, and more preferably 1.0 to 5.0 mass %. As long as the content of the amine compound containing the ditolylguanidine is within the above described range, it is possible to improve solder wettability.

The flux of the present invention can further contain an amine compound except ditolylguanidine, an organohalogen compound, an amine hydrohalide salt, a rosin-based resin, an antioxidant, a thixotropic agent and a solvent.

As the amine compounds except the ditolylguanidine, aliphatic amines, aromatic amines, amino alcohols, imidazoles, benzotriazoles, amino acids, guanidines, hydrazides and the like can be used. Examples of the aliphatic amines include dimethylamine, ethylamine, 1-aminopropane, isopropylamine, trimethylamine, allylamine, n-butylamine, diethylamine, sec-butylamine, tert-butylamine, N,N-dimethylethylamine, isobutylamine and cyclohexylamine. Examples of the aromatic amines include aniline, N-methylaniline, diphenylamine, N-isopropylaniline and p-isopropylaniline. Examples of the amino alcohols include 2-aminoethanol, 2-(ethylamino)ethanol, diethanolamine, diisopropanolamine, triethanolamine, N-butyl diethanolamine, triisopropanolamine, N,N-bis(2-hydroxyethyl)-N-cyclohexylamine, N,N,N',N'-tetrakis(2-hydroxypropyl)ethylenediamine and N,N,N',N'',N''-pentakis(2-hydroxypropyl)diethylenetriamine. Examples of the imidazoles include 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1)]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, an epoxy-imidazole adduct, 2-methylbenzimidazole, 2-octyl benzimidazole, 2-pentylbenzimidazole, 2-(1-ethylpentyl) benzimidazole, 2-nonylbenzimidazole, 2-(4-thiazolyl)benzimidazole, and benzimidazole. Examples of the benzotriazoles include 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl] methylbenzotriazole, 2,2'-[[(methyl-1H-benzotriazol-1-yl)methyl]imino]bisethanol, an aqueous solution of 1,2,3-benzotriazole sodium salt, 1-(1',2'-dicarboxyethyl)benzotriazole, 1-(2,3-dicarboxypropyl)benzotriazole, 1-[(2-ethylhexylamino) methyl]benzotriazole, 2,6-bis[(1H-benzotriazol-1-yl)methyl]-4-methylphenol, and 5-methylbenzotriazole. Examples of the amino acids include alanine, arginine, asparagine, aspartic acid, cysteine hydrochloride, glutamine, glutamic acid, glycine, histidine, isoleucine, leucine, lysine monohydrochloride, methionine, phenylalanine, proline, serine, threonine, tryptophan, tyrosine, valine, β-alanine, γ-aminobutyric acid, δ-amino valeric acid, ε-aminohexanoic acid, ε-caprolactam and 7-aminoheptanoic acid. Examples of the guanidines include dicyandiamide. Examples of the hydrazides include carbodihydrazide, malonic acid dihydrazide, succinic acid dihydrazide, adipic acid dihydrazide, 1,3-bis(hydrazinocarbonoethyl)-5-isopropylhydantoin, sebacic acid dihydrazide, dodecanedioic acid dihydrazide, 7,11-octadecadiene-1,18-dicarbohydrazide and isophthalic acid dihydrazide.

The content of an amine compound except ditolylguanidine based on the total mass of the flux is preferably 0 to 10.0 mass %, more preferably 0 to 5.0 mass %, and most preferably 2.0 to 5.0 mass %. As long as the content of the amine compound except the ditolylguanidine is within the above described range, it is possible to improve solder wettability.

As the organohalogen compound, trans-2,3-dibromo-2-butene-1,4-diol, 2,3-dibromo-1,4-butanediol, 2,3-dibromo-1-propanol, 2,3-dichloro-1-propanol, 1,1,2,2-tetrabromoethane, 2,2,2-tribromoethanol, pentabromoethane, carbon tetrabromide, 2,2-bis (bromomethyl)-1,3-propanediol, meso-2,3-dibromosuccinic acid, chloroalkane, chlorinated fatty acid ester, n-hexadecyltrimethylammonium bromide, triallyl isocyanurate hexabromide, 2,2-bis[3,5-dibromo-4-(2,3-dibromopropoxy)phenyl]propane, bis[3,5-dibromo-4-(2,3-dibromopropoxy) phenyl]sulfone, ethylene bispentabromobenzene, 2-chloromethyl oxirane, HET acid, HET anhydride, a bromo bisphenol A type epoxy resin and the like can be used. The content of the organohalogen compound based on the total mass of the flux is preferably 0 to 7.0 mass %, and more preferably 2.0 to 5.0 mass %. As long as the content of the organohalogen compound is within the above described range, it is possible to improve flux wettability.

As the amine hydrohalide salt, a hydrohalide salt (salt of HF, HCl, HBr or HI) can be used. Examples of the amine hydrohalide salts include stearylamine hydrochloride, diethylaniline hydrochloride, diethanolamine hydrochloride, 2-ethylhexylamine hydrobromide, pyridine hydrobromide, isopropylamine hydrobromide, cyclohexylamine hydrobromide, diethylamine hydrobromide, monoethylamine hydrobromide, 1,3-diphenylguanidine hydrobromide, dimethylamine hydrobromide, dimethylamine hydrochloride, rosin amine hydrobromide, 2-ethylhexylamine hydrochloride, isopropylamine hydrochloride, cyclohexylamine hydrochloride, 2-pipecoline hydrobromide, 1,3-diphenylguanidine hydrochloride, dimethylbenzylamine hydrochloride, hydrazine hydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, monoethylamine hydrochloride, monoethylamine hydrobromide, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosin amine hydrobromide, 2-phenylimidazole hydrobromide, 4-benzylpyridine hydrobromide, L-glutamic acid hydrochloride, N-methylmorpholine hydrochloride, betaine hydrochloride, 2-pipecoline hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosin amine hydrofluoride, cyclohexylamine tetrafluoroborate and dicyclohexylamine tetrafluoroborate. The content of the amine hydrohalide salt based on the total mass of the flux is preferably 0 to 3.0 mass %, and more preferably 0.5 to 1.5 mass %. As long as the content of the amine hydrohalide salt is within the above described range, it is possible to improve flux wettability.

Examples of the rosin-based resins include raw material rosins such as gum rosin, wood rosin and tall oil rosin, and derivatives obtained from the raw material rosin. Examples of the derivatives include: purified rosin, hydrogenated rosin, disproportionated rosin and polymerized rosin; and modified products of α,β-unsaturated carboxylic acid (acrylated rosin, maleinized rosin, fumarylated rosin and the like); and a purified product, a hydride and a disproportionated product of the polymerized rosin; and a purified product, a hydride and a disproportionated product of the modified product of the α,β-unsaturated carboxylic acid. Two or more of the above derivatives can be used.

The content of the rosin-based resin based on the total mass of the flux is preferably 0 to 70.0 mass %; in the case of a low content, is more preferably 5.0 to 10.0 mass %; and in the case of a high content, is more preferably 30.0 to 70.0 mass %, and most preferably 40.0 to 60.0 mass %.

In addition to the rosin-based resin, at least one of other resins selected from a terpene resin, a modified terpene resin, a terpene phenol resin, a modified terpene phenol resin, a styrene resin, a modified styrene resin, a xylene resin and a modified xylene resin can be further contained. As the modified terpene resin, an aromatic modified terpene resin, a hydrogenated terpene resin, a hydrogenated aromatic modified terpene resin and the like can be used. As the modified terpene phenol resin, a hydrogenated terpene phenol resin and the like can be used. As the modified styrene resin, a styrene acrylic resin, a styrene maleic acid resin and the like can be used. As the modified xylene resin, a phenol-modified xylene resin, an alkylphenol-modified xylene resin, a phenol-modified resol type xylene resin, a polyol-modified xylene resin, a polyoxyethylene-added xylene resin and the like can be used.

The total content of the above described other resins based on the total mass of the flux is preferably 0 to 40.0 mass %, and more preferably 0 to 20.0 mass %.

Furthermore, in place of the rosin-based resin, at least one of water-soluble resins selected from ester adducts of polyethylene glycol, various alcohols with EO, PO, EO/PO and amide adducts of various amines with BO, PO, EO/PO can be contained.

The total content of the above described water-soluble resins based on the total mass of the flux is preferably 0 to 80.0 mass %, and more preferably 30.0 to 60.0 mass %.

As the antioxidant, a hindered phenol-based antioxidant and the like can be used. The content of the antioxidant based on the total mass of the flux is not limited in particular, as long as the content is in a range that does not hinder the effect of the present application, and is preferably 0 to 10.0 mass %, and more preferably 3.0 to 7.0 mass %.

As the thixotropic agent, hydrogenated castor oil, an aliphatic amide thixotropic agent and the like can be used. The content of the thixotropic agent based on the total mass of the flux is preferably 0 to 10.0 mass %, and more preferably 3.0 to 8.0 mass %.

As the solvent, various glycol ether-based solvents and the like, for example, phenyl glycol, hexylene glycol, hexyl diglycol and the like can be used. The content of the solvent based on the total mass of the flux is preferably 20.0 to 90.0 mass %. The content of the solvent can be appropriately set according to a viscosity of the flux to be designed.

The solder paste of the present invention contains the above described flux and a solder powder.

The "flux" in the solder paste of the present invention means the whole components except the solder powder in the solder paste. In the solder paste of the present invention, a weight ratio of the solder powder to the flux (solder powder:flux) can be appropriately set according to the application.

As the alloy composition of the solder powder, a Sn—Ag-based alloy, a Sn—Cu-based alloy, a Sn—Ag—Cu-based alloy, a Sn—In-based alloy, a Sn—Bi-based alloy, a Sn—Sb-based alloy and alloys in which Ag, Cu, Ni, Co, P, Ge, Sb, In, Bi, Zn and the like are added to these alloys can be used.

In the present invention, the flux can be prepared by heating and mixing ditolylguanidine and an organic acid by a method known in the art. The solder paste can be produced by kneading the flux and the solder powder according to a method known in the art.

The solder paste of the present invention thus prepared can be applied to a soldering part of a circuit board having a fine structure in electronic equipment, for example, by a printing method using a metal mask, an ejection method using a dispenser, or a transfer method using a transfer pin; and reflow can be performed.

The present invention will be specifically described below with reference to Examples, but the present invention is not limited to the contents described in the Examples.

EXAMPLES (Evaluation)

Each flux of Examples 1 to 22 and Comparative Examples 1 to 7 was subjected to (1) evaluation of the precipitation of a crystal and (2) evaluation of the solder wettability, as follows.

(1) Evaluation of Precipitation of Crystal

Each of the fluxes of Examples 1 to 22 and Comparative Examples 1 to 7 was printed on a Bare-Cu plate having a length of 50 mm×a width of 50 mm×a thickness of 0.5 mm with the use of a mask made from stainless steel, which has an arrangement of openings of predetermined patterned holes described in the sag test at the time of heating in JIS Z3284-3: 2014. The presence or absence of the precipitation of the crystal on the printed part of the Bare-Cu plate was visually checked. Then, the evaluation was carried out according to the following criteria.

There is not the precipitation of the crystal on all the printed parts: ○ (good)

There is the precipitation of the crystal on one or more of all the printed parts: x (poor)

(2) Evaluation of Solder Wettability (Meniscograph Test Method)

Test Plate

A copper plate having a width of 5 mm×a length of 25 mm×a thickness of 0.5 mm was subjected to oxidation treatment at 150° C. for 1 hour to obtain a copper oxide plate which was a test plate.

Test Apparatus and Test Conditions

Test apparatus: Solder Checker SAT-5200 (manufactured by RHESCA)

Solder: Sn-3Ag-0.5 Cu (where each numerical value is in mass %)

Speed of immersion into solder tank: 5 mm/sec (JIS Z 3198-4)

Depth of immersion into solder tank: 2 mm (JIS Z 3198-4)

Immersion time in solder tank: 10 sec (JIS Z 3198-4)

Temperature of solder tank: 245° C. (JIS C 60068-2-54)

Test Method (2-1) Application of Flux

Test plates were immersed by 5 mm in the respective fluxes of Examples 1 to 22 and Comparative Examples 1 to 7, which were measured into a beaker, and the flux was applied to the test plate.

(2-2) Immersion into Solder Tank

Immediately after the flux was applied to the test plate, the test plate to which the flux was applied was immersed in the solder tank, and a zero cross time (sec) was obtained. Measurements were carried out five times on each of the fluxes of Examples 1 to 22 and Comparative Examples 1 to 7, and the average value of the obtained five zero cross times (sec) was calculated.

Then, the evaluation was carried out according to the following criteria.

The average value of the zero cross time (sec) is 4 seconds or shorter: ○ (good)

The average value of the zero cross time (sec) exceeds 4 seconds: x (poor)

Examples 1 to 11 and Comparative Examples 1 to 7

The fluxes of Examples 1 to 11 and Comparative Examples 1 to 7 were prepared with the compositions shown in the following Tables 1 and 2.

The numerical value of each component in the following Tables 1 to 3 represents the mass % of each component based on the total mass of the flux.

Then, the fluxes of Examples 1 to 11 and Comparative Examples 1 to 7 were subjected to the above described (1) evaluation of the precipitation of the crystal and (2) evaluation of the solder wettability. The evaluation results are shown in the following Tables 1 and 2.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Aromatic guanidine compound | 1,3-Di-o-tolylguanidine | 5.0 | 0.4 | 5.0 | 10.0 | 2.0 | 5.0 | 5.0 | 5.0 | 5.0 | 5.0 | 5.0 |
| Amine (except aromatic guanidine compound) | 2-Phenylimidazole | | | 5.0 | | | | | | | | |
| Organic acid | Glutaric acid | 5.0 | 5.0 | 5.0 | 5.0 | 1.0 | 10.0 | | | | | |
| | Succinic acid | | | | | | | 5.0 | | | | |
| | Maleic acid | | | | | | | | 5.0 | | | |
| | Adipic acid | | | | | | | | | 5.0 | | |
| | DL-Malic acid | | | | | | | | | | 5.0 | |
| | Diglycolic acid | | | | | | | | | | | 5.0 |
| Organohalogen compound | trans-2,3-Dibromo-2-butene-1,4-diol | | | | | 3.0 | | | | | | |
| Amine hydrohalide salt | 1,3-Diphenylguanidine hydrobromide | | | | | 1.0 | | | | | | |
| Rosin-based resin | Modified rosin | 50.0 | 54.6 | 45.0 | 45.0 | 43.0 | 45.0 | 50.0 | 50.0 | 50.0 | 50.0 | 50.0 |
| Antioxidant | Hindered phenol-based antioxidant | | | | | 10.0 | | | | | | |
| Solvent | Phenyl glycol | 40.0 | | 40.0 | 40.0 | 40.0 | 40.0 | 40.0 | 40.0 | 20.0 | 20.0 | 20.0 |
| | Hexyl diglycol | | 40.0 | | | | | | | 20.0 | 20.0 | 20.0 |
| | Total | 100.0 | 100.0 | 100.0 | 100.0 | 100.0 | 100.0 | 100.0 | 100.0 | 100.0 | 100.0 | 100.0 |
| | Organic acid/amine (mass ratio) | 1.0 | 12.5 | 0.5 | 0.5 | 0.5 | 2.0 | 1.0 | 1.0 | 1.0 | 1.0 | 1.0 |
| | Precipitation of crystal | ○ | ○ | ○ | ○ | ○ | ○ | ○ | ○ | ○ | ○ | ○ |
| | Solder wettability | ○ | ○ | ○ | ○ | ○ | ○ | ○ | ○ | ○ | ○ | ○ |
| | Comprehensive evaluation | ○ | ○ | ○ | ○ | ○ | ○ | ○ | ○ | ○ | ○ | ○ |

TABLE 2

| | | Comparative Example | | | | | | |
|---|---|---|---|---|---|---|---|---|
| | | 1 | 2 | 3 | 4 | 5 | 6 | 7 |
| Aromatic guanidine compound | 1,3-Di-o-tolylguanidine | | | | | | | 4.0 |
| | 1,3-Diphenylguanidine | 5.0 | 5.0 | 5.0 | 5.0 | 5.0 | 5.0 | |
| Organic acid | Glutaric acid | 5.0 | | | | | | |
| | Succinic acid | | 5.0 | | | | | |
| | Maleic acid | | | 5.0 | | | | 0.5 |
| | Adipic acid | | | | 5.0 | | | |
| | DL-Malic acid | | | | | 5.0 | | |
| | Diglycolic acid | | | | | | 5.0 | |
| Rosin-based resin | Modified rosin | 50.0 | 50.0 | 50.0 | 50.0 | 50.0 | 50.0 | 55.5 |
| Solvent | Phenyl glycol | | 40.0 | 40.0 | 20.0 | 20.0 | 20.0 | 40.0 |
| | Hexyl diglycol | 40.0 | | | 20.0 | 20.0 | 20.0 | |
| | Total | 100.0 | 100.0 | 100.0 | 100.0 | 100.0 | 100.0 | 100.0 |
| | Organic acid/amine (mass ratio) | 1.0 | 1.0 | 1.0 | 1.0 | 1.0 | 1.0 | 0.125 |
| | Precipitation of crystal | X | X | X | X | X | X | ○ |
| | Solder wettability | ○ | ○ | ○ | ○ | ○ | ○ | X |
| | Comprehensive evaluation | X | X | X | X | X | X | X |

According to the above described results of Table 1, in the fluxes of Examples 1 to 11, which contained 0.4 to 10.0 mass % of ditolylguanidine and 1 to 10.0 mass % of an organic acid, and did not contain diphenylguanidine as an amine compound, there was not the precipitation of the crystal and the solder wettability was also good. As is understood particularly from the results of Examples 1 to 6, even when the content (mass %) of the ditolylguanidine or the organic acid was varied within each numerical range, both of the evaluations of the precipitation of the crystal and the solder wettability did not change and remained good. In addition, as is understood from the results of Examples 1 and 7 to 11, even when the type of the organic acid was changed, both of the evaluations of the precipitation of the crystal and the solder wettability did not change and remained good.

On the other hand, according to the results in Table 2, in the fluxes of Comparative Examples 1 to 6, which did not contain ditolylguanidine but contained diphenylguanidine and contained 1.0 to 10.0 mass % of an organic acid, the solder wettability was good, regardless of the type of the organic acid, but the precipitation of the crystal occurred.

In addition, in the flux of Comparative Example 7, which contained 0.4 to 10.0 mass % of ditolylguanidine and less than 1.0 mass % of an organic acid and did not contain diphenylguanidine as an amine compound, the crystal did not precipitate, but the solder wettability was poor.

Examples 12 to 22

The fluxes of Examples 12 to 22 were prepared in the same manner as in Examples 1 to 11 and Comparative Examples 1 to 7, except that the compositions shown in the following Table 3 were used in place of the compositions shown in the above described Tables 1 and 2.

Then, each flux of Examples 12 to 22 was subjected to the above described (1) evaluation of the precipitation of the crystal and (2) evaluation of the solder wettability. The evaluation results are shown in the following Table 3.

According to the above described results of Table 3, in the fluxes of Examples 12 to 22, which contained 0.4 to 10.0 mass % of ditolylguanidine and 1.0 to 10.0 mass % of an organic acid and did not contain diphenylguanidine as an amine compound, there was not the precipitation of the crystal, and the solder wettability was also good. As is understood particularly from the results of Examples 12 to 15 to which an amine compound other than ditolylguanidine and diphenylguanidine was added as an additional component, Examples 16 to 20 to which an organohalogen compound, an amine hydrohalide salt, an antioxidant or a thixotropic agent was added as an additional component, and Examples 20 and 21 in which the weight ratio between a rosin-based resin and a solvent was changed, in both of the evaluations of the precipitation of the crystal and the solder wettability, there was no change and the fluxes remained good, regardless of the presence or absence and the content of these components.

As described above, it has been found from the results of Tables 1 to 3 that a flux which does not precipitate the crystal and is excellent in solder wettability is obtained by using a combination of 0.4 to 10.0 mass % of ditolylguanidine and 1.0 to 10.0 mass % of an organic acid.

The invention claimed is:

1. A flux comprising 0.4 to 10.0 mass % of ditolylguanidine and 1.0 to 10.0 mass % of an organic acid, and not comprising diphenylguanidine as an amine compound.

2. The flux according to claim 1, wherein a mass ratio of the organic acid to an amine compound comprising the ditolylguanidine (organic acid/amine compound) is 0.5 to 12.5.

3. The flux according to claim 1, further comprising: 0 to 10.0 mass % of an amine compound except the ditolylguanidine; 0 to 7.0 mass % of an organohalogen compound; 0 to 3.0 mass % of an amine hydrohalide salt; 0 to 70.0 mass % of a rosin-based resin; 0 to 10.0 mass % of an antioxidant; 0 to 10.0 mass % of a thixotropic agent; and 20.0 to 90.0 mass % of a solvent.

TABLE 3

| | | Example | | | | | | | | | | |
|---|---|---|---|---|---|---|---|---|---|---|---|---|
| | | 12 | 13 | 14 | 15 | 16 | 17 | 18 | 19 | 20 | 21 | 22 |
| Aromatic guanidine compound | 1,3-Di-o-tolylguanidine | 5.0 | 5.0 | 5.0 | 5.0 | 5.0 | 5.0 | 5.0 | 5.0 | 5.0 | 5.0 | 5.0 |
| Amine (except aromatic guanidine compound) | 2-Phenylimidazole | 1.0 | | | | | | | | | | |
| | Benzotriazole | | 1.0 | | | | | | | | | |
| | Diisopropylamine | | | 1.0 | | | | | | | | |
| | 2,2'-(Cyclohexylimino) bisethanol | | | | 1.0 | | | | | | | |
| Organic acid | Glutaric acid | 5.0 | 5.0 | 5.0 | 5.0 | 5.0 | 5.0 | 5.0 | 5.0 | 5.0 | 5.0 | 5.0 |
| Organohalogen compound | trans-2,3-Dibromo-2-butene-1,4-diol | | | | | 7.0 | | | | | | |
| Amine hydrohalide salt | Ethylamine hydrobromide | | | | | | 3.0 | | | | | |
| | 1,3-Diphenylguanidine hydrobromide | | | | | | | 3.0 | | | | |
| Rosin-based resin | Modified rosin | 49.0 | 49.0 | 49.0 | 49.0 | 43.0 | 47.0 | 47.0 | 40.0 | 40.0 | | 70.0 |
| Antioxidant | Hindered phenol-based antioxidant | | | | | | | | 10.0 | | | |
| Thixotropic agent | Hydrogenated castor oil | | | | | | | | | 10.0 | | |
| Solvent | Phenyl glycol | 40.0 | 40.0 | 40.0 | 40.0 | 40.0 | 40.0 | 40.0 | 40.0 | 40.0 | 90.0 | 20.0 |
| | Total | 100.0 | 100.0 | 100.0 | 100.0 | 100.0 | 100.0 | 100.0 | 100.0 | 100.0 | 100.0 | 100.0 |
| | Organic acid/amine (mass ratio) | 0.833 | 0.833 | 0.833 | 0.833 | 1.0 | 1.0 | 1.0 | 1.0 | 1.0 | 1.0 | 1.0 |
| | Precipitation of crystal | ◯ | ◯ | ◯ | ◯ | ◯ | ◯ | ◯ | ◯ | ◯ | ◯ | ◯ |
| | Solder wettability | ◯ | ◯ | ◯ | ◯ | ◯ | ◯ | ◯ | ◯ | ◯ | ◯ | ◯ |
| | Comprehensive evaluation | ◯ | ◯ | ◯ | ◯ | ◯ | ◯ | ◯ | ◯ | ◯ | ◯ | ◯ |

4. A solder paste comprising the flux according to claim 1 and a solder powder.

5. The flux according to claim 2, further comprising: 0 to 10.0 mass % of an amine compound except the ditolylguanidine; 0 to 7.0 mass % of an organohalogen compound; 0 to 3.0 mass % of an amine hydrohalide salt; 0 to 70.0 mass % of a rosin-based resin; 0 to 10.0 mass % of an antioxidant; 0 to 10.0 mass % of a thixotropic agent; and 20.0 to 90.0 mass % of a solvent.

6. A solder paste comprising the flux according to claim 2 and a solder powder.

7. A solder paste comprising the flux according to claim 3 and a solder powder.

* * * * *